May 27, 1941.　　　W. W. SHERWOOD　　　2,243,130
POLYPHASE WATT-HOUR METER CONSTRUCTION
Filed Feb. 10, 1938　　　2 Sheets-Sheet 1
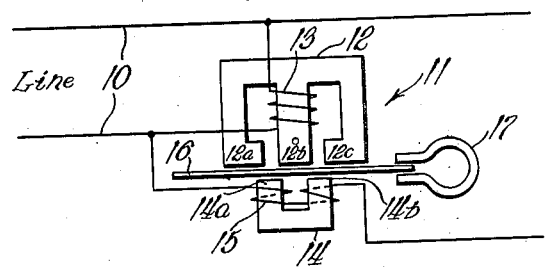
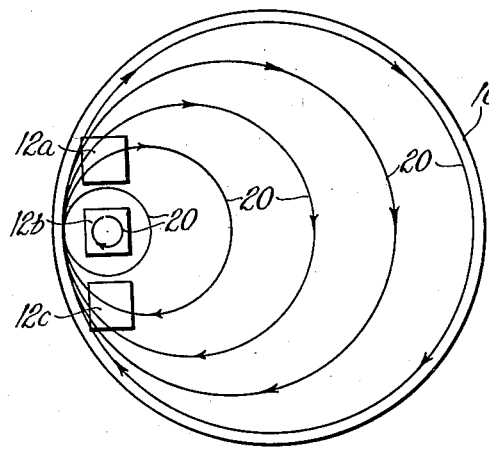
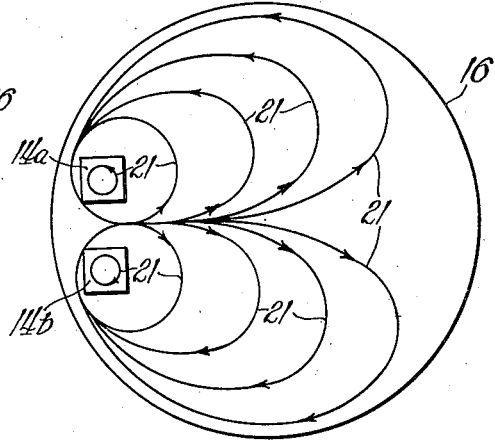
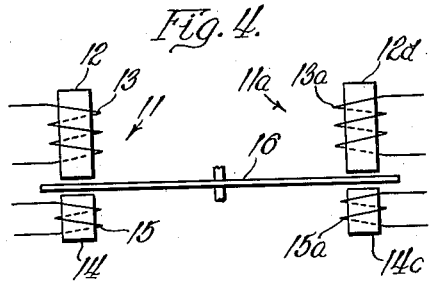
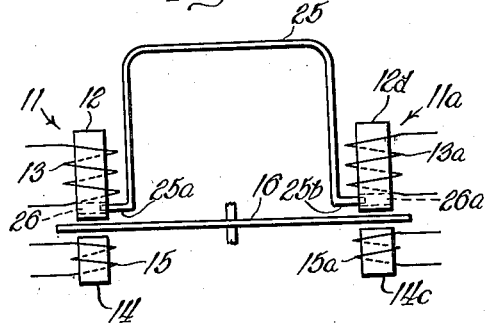
Inventor
William W. Sherwood
By Brown, Jackson, Boettcher & Dienner
Attys.

May 27, 1941.  W. W. SHERWOOD  2,243,130
POLYPHASE WATT-HOUR METER CONSTRUCTION
Filed Feb. 10, 1938  2 Sheets-Sheet 2

HIGH PERMEABILITY MAGNETIC
BRIDGE FOR NEUTRALIZING
STRAY MAGNETIC FLUX

Inventor
William W. Sherwood
By Brown, Jackson, Boettcher & Dienner
Attys.

Patented May 27, 1941

2,243,130

UNITED STATES PATENT OFFICE 2,243,130

POLYPHASE WATT-HOUR METER CONSTRUCTION

William W. Sherwood, Springfield, Ill., assignor to Sangamo Electric Company, Springfield, Ill., a corporation of Illinois Application February 10, 1938, Serial No. 189,759

3 Claims. (Cl. 171—264)

My invention relates, generally, to electric measuring devices, and it has particular relation to polyphase watthour meters. The invention disclosed in this application constitutes an improvement over the construction shown in the copending application of Fred Kurz, Serial No. 136,337, filed April 12, 1937, and assigned to the assignee of this application, now issued as Patent No. 2,129,010.

According to said patent of Kurz, two watthour meter units are provided for applying torque to a single disc. The two watthour meter units are provided for measuring the total energy that has been consumed in a polyphase alternating current circuit. In order to prevent interference between the two watthour meter units which causes errors in registration, a magnetic bridge is provided, which is arranged to bridge the two watthour meter units. This bridge is intended to reduce the interaction between the units which would otherwise take place and thereby substantially reduce the interference between them which results in inaccurate registration. By providing a high permeability path between the two units, it is possible to shield the disc to a large extent from stray magnetic fields which would interact with eddy currents in the disc and cause the interference errors.

It is with a view to further reducing the interference between the two watthour meter elements that this invention is particularly addressed. The magnetic bridging member disclosed in the patent of Kurz is modified to make it more effective and the disc is so constructed that the effect of eddy currents therein in creating interference is reduced materially.

The object of my invention, generally stated, is to provide a polyphase watthour meter of the single disc type that will be simple, efficient, and accurate in operation and which may be readily and economically manufactured.

The principal object of my invention is to reduce the interference between the watthour meter units of a two unit polyphase watthour meter of the single disc type so that the registration of the meter will be substantially unaffected by such interference.

An object of my invention is to improve the coupling between a magnetic bridging member and the cores of the voltage elements of a pair of watthour meter units acting on a single disc.

Another object of my invention is to reduce the flow of eddy currents in a single disc of a two unit watthour meter in sections thereof remote from where they originate.

Still another object of my invention is to provide for obtaining the improved coupling and reduced eddy current flow set forth in the two preceding objects in a single polyphase watthour meter.

Other objects of my invention will, in part, be obvious and, in part, appear hereinafter.

My invention, accordingly, is disclosed in the embodiment hereof shown in the accompanying drawings, and it comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which:

Figure 1 illustrates, diagrammatically, the construction and connections of a single phase alternating current watthour meter;

Figure 2 illustrates, diagrammatically, the eddy currents that are generated in the disc by the voltage elements of the single phase watthour meter unit;

Figure 3 illustrates, diagrammatically, the eddy currents that are generated in the disc by the current element of the single phase watthour meter unit;

Figure 4 illustrates, diagrammatically, the arrangement of two watthour meter units arranged to drive a single disc;

Figure 5 is a view diagrammatically illustrating how one feature of my invention may be applied to the construction shown in Figure 4 for reducing interference between the two watthour meter units;

Figure 6:
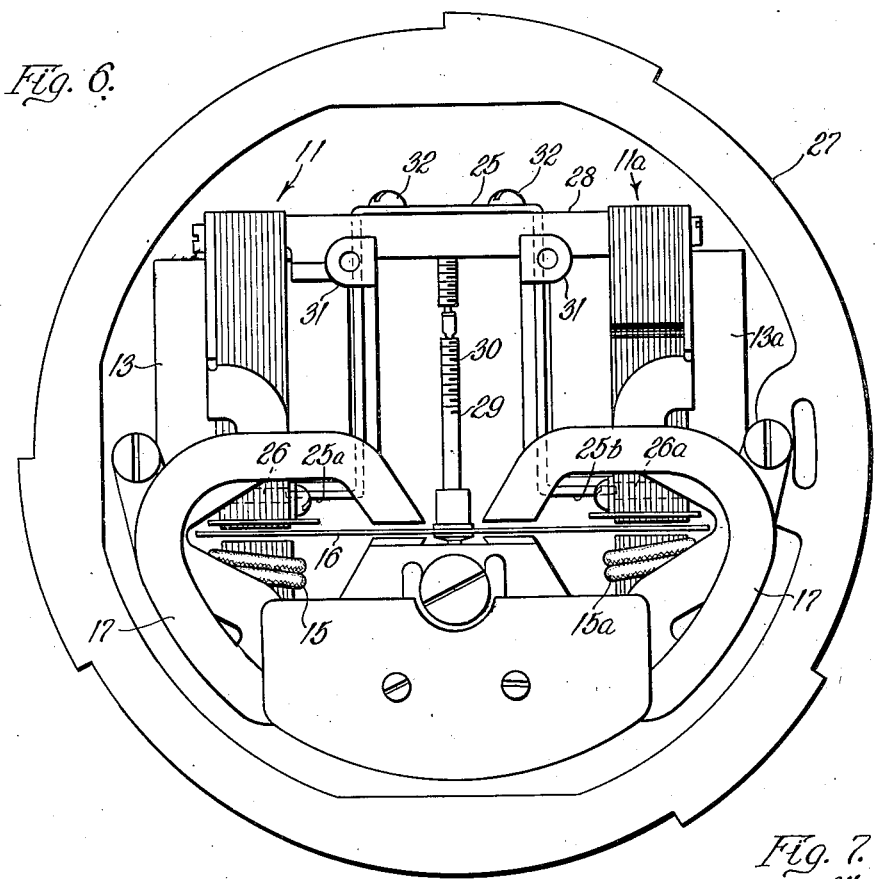
Figure 6 is a view, in front elevation, of a two unit watthour meter embodying the features of my invention, the cover and register having been omitted in order to more clearly illustrate the invention.

With a view to pointing out the novel features of my invention and the reasons why certain construction details are employed in a two unit single disc meter, reference will first be had to the functioning of a watthour meter in which a single watthour meter unit cooperates with a disc to apply torque thereto for measuring the energy that has flowed in a circuit. As shown in Figure 1 of the drawings, the reference character 10 designates a single phase alternating current circuit, the flow of energy in which is to be measured by a watthour meter that is designated generally at 11. The meter 11 comprises an E-shaped core formed of laminations, on the central leg of which is positioned a voltage coil 13 that is connected across the conductors of the circuit 10. Underneath the core 12 is a C-shaped core 14 that is also formed of laminations of magnetic material, and it has wound on its legs a pair of current coils 15 through which the current in the conductors of the circuit 10 flows. In the air gap formed between the pole tips $12_a$, $12_b$, and $12_c$ of the core 12 and the pole tips $14_a$ and $14_b$ of the core 14, a disc 16 is rotatably mounted so that a torque is applied thereto which is function of the voltage across and the current in the circuit 10. A permanent magnet 17 is provided for damping the movement of the disc 16 in the usual manner.

In Figure 2 of the drawings by means of the curved lines 20 and the arrow heads thereon I have illustrated the instantaneous direction of the eddy currents in the disc 16 as caused by the flux between the pole tips $12_a$, $12_b$, and $12_c$ that is generated by the voltage winding 13. These eddy currents react with the flux generated by the current winding 15 in accordance with Lenz' law and produce torque for rotating the disc 16.

In a similar manner in Figure 3 of the drawings, the eddy currents that are generated in the disc 16 by the flux between the pole tips $14_a$ and $14_b$ are indicated by the curved lines 21 with the arrowheads thereon. It will be understood that this representation is for the instantaneous directions of the eddy currents. These eddy currents react with the flux generated by the voltage winding 13 for also producing torque which rotates the disc 16.

It will be observed that the eddy currents represented by the lines 20 and 21 in Figures 2 and 3 are not confined to the region directly underneath the pole tips of the cores 12 and 14 but, rather, that they spread to the remote regions of the disc 16. It will also be observed that the directions of flow of the eddy currents are not circumferential. However, they may be resolved into radial and tangential components. In the regions remote from the cores 12 and 13 there simultaneously exists stray magnetic fields that are generated by the voltage and current windings 13 and 15. These stray magnetic fields may be separated into components that are perpendicular, tangential, and radial with respect to the axis of rotation of the disc 16. The reaction between the perpendicular components of these stray magnetic fields and the radial components of the eddy currents gives rise to forces which apply additional torque to the disc 16. In a watthour meter in which a single unit is employed and reacts with a single disc, such as shown in Figure 1, these forces go to make up the meter characteristics and, for any particular set of conditions, they can be readily determined. However, when two watthour meter units are arranged to drive a single disc, such as the disc 16, other factors are involved which cannot so readily be determined.

In Figure 4 of the drawings I have illustrated diagrammatically the arrangement of two watthour meter units 11 and $11_a$ for applying torque to a single disc 16. The unit 11 is provided with the voltage winding 13 and current winding 15 which may be connected to measure the current and voltage of one phase of a polyphase circuit. The unit $11_a$ is provided with a voltage winding $13_a$ and a current winding $15_a$ which are arranged to measure the voltage and current of another phase of the polyphase circuit. Even if the units 11 and $11_a$ are diametrically opposite and are perfectly symmetrical from a mechanical and electrical standpoint, the torque which is applied for rotating the disc 16 will not be the sum of the torques generated by the units 11 and $11_a$ acting alone. This arises from the fact, as may be seen in Figure 3, that radial components of the eddy currents in the disc 16 represented by the lines 21 and resulting from flux generated by the current winding 15, may interact with flux generated by the voltage winding $13_a$ of the opposite watthour meter unit $11_a$. In other words there will be additional torque applied to the disc 16 as the result of interaction between the units 11 and $11_a$. In actual practice it is impossible to secure perfect mechanical and electrical symmetry for the two units 11 and $11_a$ and, therefore, it is necessary to provide means which will limit to a practical operating minimum the interaction between these two units.

As described in said patent of Kurz, referred to hereinbefore, the interaction between the two units is materially reduced by the provision of an inverted U-shaped bridging member 25 that is shown digrammatically on Figure 5 of the drawings. According to said patent of Kurz, the ends $25_a$ and $25_b$ of the bridging member 25 are turned outwardly and while they are adjacent the upper surface of the disc 16, they are spaced slightly from the adjacent sides of the cores 12 and $12_d$.

Figure 7:
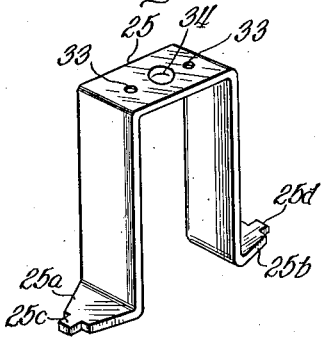
Figure 7 is a perspective view of the magnetic bridging member employed in practicing my invention.

I have found that the interaction between the watthour meter units 11 and $11_a$ can be further reduced by providing the ends $25_a$ and $25_b$ of the bridging member 25 with the laterally extending tips $25_c$ and $25_d$, as shown in Figure 7, which interfit with suitable apertures 26 and $26_a$ which extend through the middle legs of the cores 12 and $12_d$, as shown in Figure 5. This construction and arrangement of the bridging member 25 provides closer coupling between it and the cores 12 and $12_d$ of the watthour meter units 11 and $11_a$ and reduces further the degree of interference and consequent errors in registration between the units 11 and $11_a$. By combining this construction and arrangement of the bridging member 25 with certain changes in the construction of the disc 16 which will presently be described, it is possible to substantially completely eliminate interference between the watthour meter units 11 and $11_a$.

The manner in which the bridging member 25 may be incorporated in a commercial type of polyphase watthour meter is more clearly shown in Figure 6 of the drawings. As there shown, the polyphase watthour meter is provided with a base 27 on which is mounted a frame member 28 that is formed of non-magnetic material, such as aluminum or an aluminum alloy. The disc 16 is rotatably mounted on the frame member 28 by means of a shaft 29 that is provided with a worm 30 for driving a register (not shown) that may be mounted on suitable ears or bosses 31 which may be integrally formed with the frame member 28. The bridging member 25 is secured in position on the top of the frame member 28 by any suitable means, such as by the screws 32 that project through clearance holes 33 in the flat portion between the vertical branches thereof, as is shown in Figure 7. An enlarged clearance hole 34 is also provided in this portion to permit adjustment of the upper bearing of the shaft 29. It will be observed that, in this construction, two permanent magnets 17 are mounted on the frame member 28 and serve to damp the rotation of the disc 16.

While the magnetic bridging member 25, which is preferably formed of high permeability magnetic material such as "Mumetal" or other similar magnetic alloy, can substantially reduce the interaction between the opposite voltage and current coils, it does not reduce the interference between these coils or elements resulting from dissymmetry. This dissymmetry may be due either to mechanical misalignment or to difference in magnetic properties of the magnetic circuits of the cores of the watthour meter units 11 and 11a, or to both.

Figure 8:
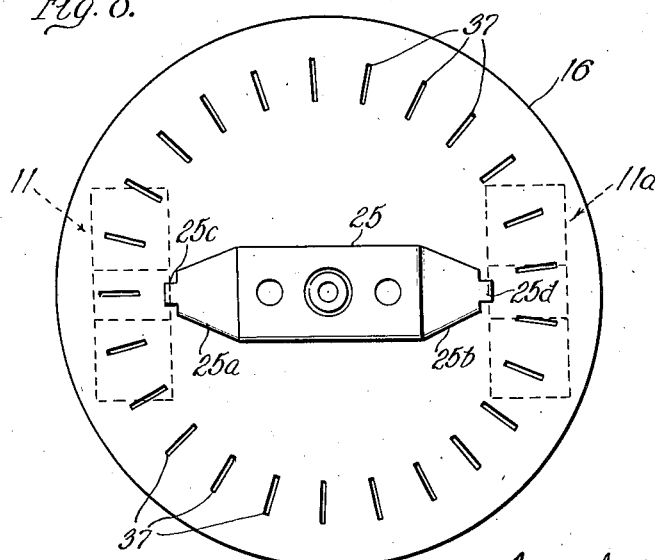
Figure 8 is a top plan view of the disc and bridging member with the cores of the watthour meter units being shown by broken lines.

With a view to reducing the interference between the units 11 and 11a from this cause, the disc 16 is provided, as shown in Figure 8 of the drawings, with a plurality of radial slots 37. It will be noted that the radial slots 37 are in register with the cores of the current and voltage elements of the units 11 and 11a. The purpose of the slots 37 is to interrupt the paths for the eddy currents represented by the lines 20 and 21 in Figures 2 and 3 in the regions remote from where they originate. By this means the eddy currents in the disc 16 in the region adjacent the unit 11a and generated by the unit 11 will be reduced to a minimum so that interaction between them and the flux of the unit 11a will be substantially minimized. The same is true with regard to the eddy currents from the unit 11a in reacting with the flux from the unit 11.

The desired number of slots 37 will, in general, depend upon the arrangement of the units 11 and 11a with respect to the disc 16. The number should be sufficient to reduce the interference to a negligible value without unduly reducing the torque. Furthermore, the number and arrangement should be such as to prevent any pronounced tendency for the disc 16 to lock in certain positions at zero load, with the voltage windings 13 and 13a only energized. In general, an odd number of slots 37 is desirable, particularly in the embodiment of the invention herein disclosed where the units 11 and 11a are located on opposite sides of the disc 16. This arrangement reduces the locking tendency of the disc 16 to a point which will enable it to start under loads of less than 1% but does not permit it to creep continuously on the energization only of the voltage windings 13 and 13a.

As the following test data will show, the provision of the bridging member 25 close coupled to the cores of the voltage elements of the watthour meter units 11 and 11a combined with the provision of the radial slots 37 in the disc 16 provides a means for reducing to substantially zero the amount of interference between the two watthour meter units acting on a single disc. These data are obtained by loading one of the watthour meter units, for example the unit 11, with a unity power factor load and then applying voltage to the winding 13a or current to the winding 15a of the unit 11a. The current and voltage applied to these windings is shifted in phase with relation to the current and voltage in the windings 15 and 13 respectively which, at unity power factor, are in phase.

The difference in registration over that obtained by the unit 11 acting alone when the current or voltage applied to the unit 11a is shifted from zero degrees to 180° with respect to the current or voltage applied to the unit 11 will be designated as "A" interference. The corresponding difference in registration which results when the current or voltage applied to the unit 11a is shifted from 90° lag to 90° lead will be called "B" interference. The A interference, due either to the voltage applied to the winding 13a or the current flowing through the winding 15a, is the result of the torque produced by the interaction of each voltage element 13 or 13a with the diametrically opposite current element 15 or 15a. For the purpose of this description the terms "winding" and "element" may be used interchangeably. The B interference is the result of two factors, one being the torque produced by the interaction of the voltage elements 13 and 13a and the other being produced by the interaction of the two current elements 15 and 15a. It will be observed that the A interference is essentially independent of the load, that the B interference due to interaction of the voltage elements is predominant at light loads, and that the B interference due to the interaction of the current elements is noticeable on heavy loads.

In making the foregoing tests in a two unit watthour meter of the single disc type without the provision of the bridging member 25 or the radial slots 37 in the disc 16, it was found that the A interference was about 1.8%. That is the change in registration caused by the interfering unit was 1.8% of the registration that would have been obtained had the unit, for example the unit 13, alone been energized. The B interference under these conditions was about 0.7%.

Now when the bridging member 25 formed of high permeability magnetic material, such as "Mumetal," constructed as shown in Figure 7, is employed, a much greater coupling is provided between the units 11 and 11a and A interference averaged zero over the entire range with a variation of not more than 0.4%. The B interference was not increased but remained at about 0.7%.

In making the foregoing tests without the bridging member 25 but with the disc 16 provided with the odd number of radial slots 37, the A interference is reduced from 1.8% to about 1.2%. The B interference is reduced from about 0.7% to about 0.4%.

As a final test, the meter was provided with the bridging member 25, and the disc 16 was provided with the radial slots 37. Over the entire range the A interference averaged at zero with a variation of less than 0.2%. The B interference was reduced to less than 0.3%. This test reveals the combined effectiveness of the bridging member 25 and the radial slots 37 and shows that the interference between the two units 11 and 11a is reduced thereby to such an extent that the resulting error in registration is negligible.

On polyphase watthour meters that are employed in circuits of large current capacity, the B current interference is particularly noticeable. The construction described herein employing the radial slots 37 registering with the cores of the watthour meter units reduces such interference to a minimum.

It will be obvious that certain changes may be made in the foregoing construction and different embodiments of the invention may be made without departing from the scope thereof. Therefore, it is intended that all matter contained in the foregoing description or shown in the accompanying drawings shall be interpreted as illustrative and not in a limiting sense.

I claim as my invention.

1. In a polyphase induction watthour meter, in combination, non-magnetic frame means, a disc rotatably mounted on said frame means, a pair of induction watthour meter units carried by said frame means and cooperating with said disc for applying torque thereto, said watthour meter units being symmetrically positioned adjacent diametrically opposite edges of said disc and each including a voltage element and a current element disposed on opposite sides of said disc, and a magnetic bridge member carried by said frame means with its ends adjacent said disc and interfitting with the respective cores of the voltage elements of said watthour meter units.

2. In a polyphase induction watthour meter, in combination, non-magnetic frame means, a disc rotatably mounted on said frame means, a pair of induction watthour meter units carried by said frame means and cooperating with said disc for applying torque thereto, said watthour meter units being symmetrically positioned adjacent diametrically opposite edges of said disc and each including a voltage element and a current element disposed on opposite sides of said disc, and a magnetic bridge member carried by said frame means with its ends adjacent said disc and interfitting with the respective cores of the voltage elements of said watthour meter units, there being an odd number of uniformly spaced radial slots in said disc registering with the cores of said voltage and current elements.

3. In a polyphase induction watthour meter, in combination, a rotatably mounted disc, a pair of induction watthour meter units cooperating with said disc for applying torque thereto, said watthour meter units being symmetrically positioned adjacent diametrically opposite edges of said disc and each including a voltage element and a current element with cores individual thereto, and a magnetic bridge member extending between said units with its ends adjacent said disc and interfitting with the respective cores of like elements.

WILLIAM W. SHERWOOD.